United States Patent
Liao (10) Patent No.: US 8,818,367 B2
(45) Date of Patent: Aug. 26, 2014

(54) APPARATUSES AND METHODS FOR HANDLING MOBILITY MANAGEMENT (MM) BACK-OFF TIMERS

(75) Inventor: Ching-Yu Liao, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 101 days.

(21) Appl. No.: 13/348,205

(22) Filed: Jan. 11, 2012

(65) Prior Publication Data

US 2012/0178457 A1    Jul. 12, 2012

Related U.S. Application Data

(60) Provisional application No. 61/431,940, filed on Jan. 12, 2011.

(51) Int. Cl.
*H04W 4/00* (2009.01)

(52) U.S. Cl.
USPC ......... 455/435.1; 370/328; 370/229; 455/436

(58) Field of Classification Search
CPC ... H04W 76/027; H04W 28/02; H04W 48/02; H04W 28/0289; H04W 60/00; H04W 60/005; H04W 28/0247; H04W 36/14; H04W 28/08; H04W 60/02
USPC ............... 455/432.1–444, 450–453; 370/229, 370/230.1, 235, 252, 328
See application file for complete search history.

(56) References Cited

U.S. PATENT DOCUMENTS

| | | | |
|---|---|---|---|
| 6,356,755 B1 * | 3/2002 | Valentine et al. | 455/435.1 |
| 2007/0115847 A1 * | 5/2007 | Strutt et al. | 370/252 |
| 2008/0220772 A1 | 9/2008 | Islam et al. | |
| 2010/0144307 A1 | 6/2010 | Wu | |
| 2010/0238900 A1 | 9/2010 | Johansson et al. | |
| 2012/0002545 A1 * | 1/2012 | Watfa et al. | 370/235 |

FOREIGN PATENT DOCUMENTS

| | | |
|---|---|---|
| CN | 101754417 A | 6/2010 |
| EP | 2 194 744 A1 | 6/2010 |
| WO | WO 2005/048631 A1 | 5/2005 |

OTHER PUBLICATIONS

Nokia Siemens Networks et al: "Clarification of back-off timer usage"; 3GPP TSG SA WG2 Meeting #81; Oct. 11-15, 2010, Prague, Czech Republic; 5 pgs.

* cited by examiner

*Primary Examiner* — Daniel Lai
(74) *Attorney, Agent, or Firm* — Birch, Stewart, Kolasch & Birch, LLP (57) ABSTRACT

A mobile communication device with a wireless module and a controller module is provided. The wireless module performs wireless transceiving to and from a first service network and a second service network. The controller module transmits a first request message for a Mobility Management (MM) procedure to the first service network, and receives a first rejection message with an MM back-off timer corresponding to the first request message from the first service network via the wireless module. Also, the controller module starts the MM back-off timer for the first service network in response to the first rejection message, and transmits a second request message for the MM procedure to the second service network via the wireless module.

12 Claims, 6 Drawing Sheets

FIG. 6

APPARATUSES AND METHODS FOR HANDLING MOBILITY MANAGEMENT (MM) BACK-OFF TIMERS

CROSS REFERENCE TO RELATED APPLICATIONS

This Application claims priority of U.S. Provisional Application No. 61/431,940, filed on Jan. 12, 2011, and the entirety of which is incorporated by reference herein.

BACKGROUND OF THE INVENTION

1. Field of the Invention

The invention generally relates to handling Mobility Management (MM) back-offs, and more particularly, to apparatuses and methods for handling MM back-off timers in a per Public Land Mobile Network (PLMN) basis.

2. Description of the Related Art

In a typical mobile communications environment, a user equipment (UE), including a mobile telephone (also known as cellular or cell phone), a laptop computer with wireless communications capability, or a personal digital assistant (PDA) etc., may communicate voice and/or data signals with one or more service network. The wireless communications between the UE and the service networks may be in compliance with various wireless technologies, such as the Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA 2000) technology, Time Division-Synchronous Code Division Multiple Access (TD-SCDMA) technology, Worldwide Interoperability for Microwave Access (WiMAX) technology, Long Term Evolution (LTE) technology, LTE-Advanced technology, and others.

Figure 1:
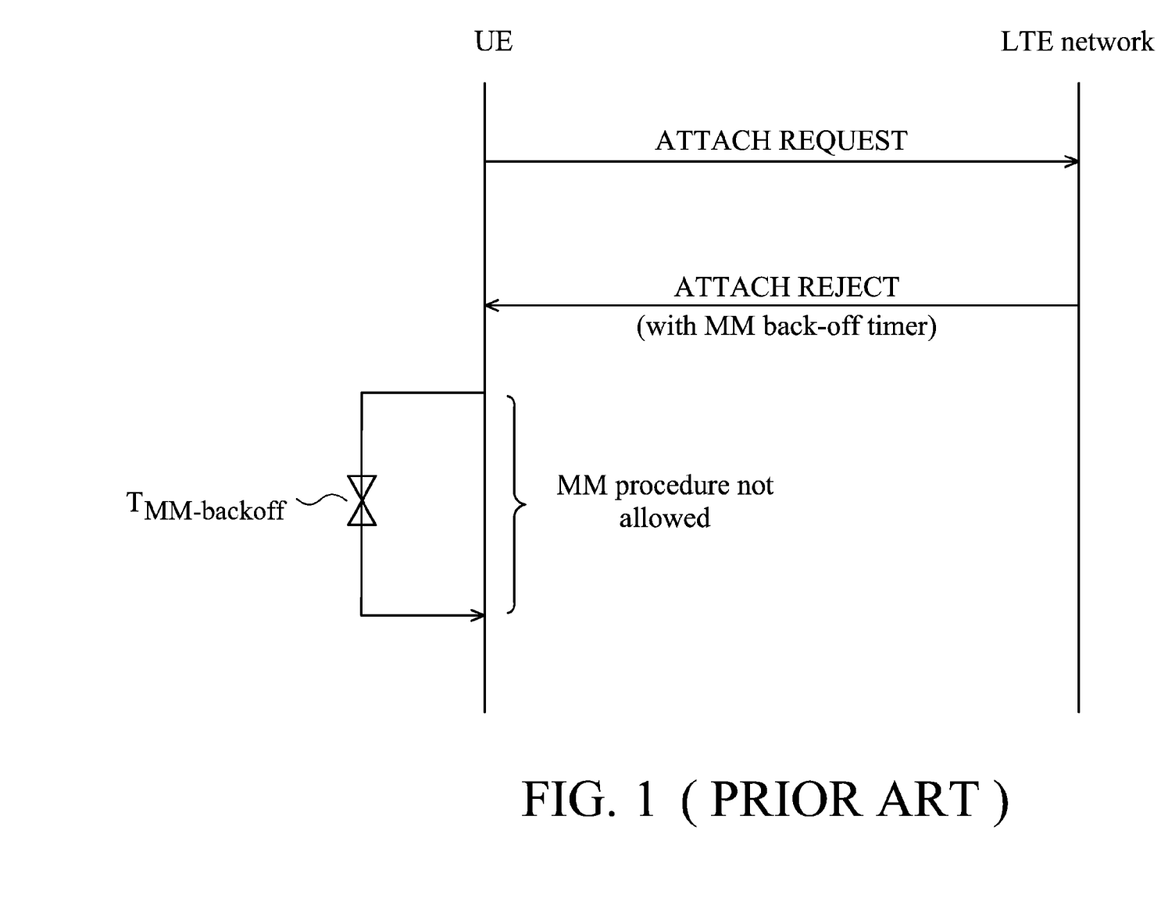
FIG. 1 is a block diagram illustrating an unsuccessful Attach procedure with an MM back-off timer.
Figure 2:
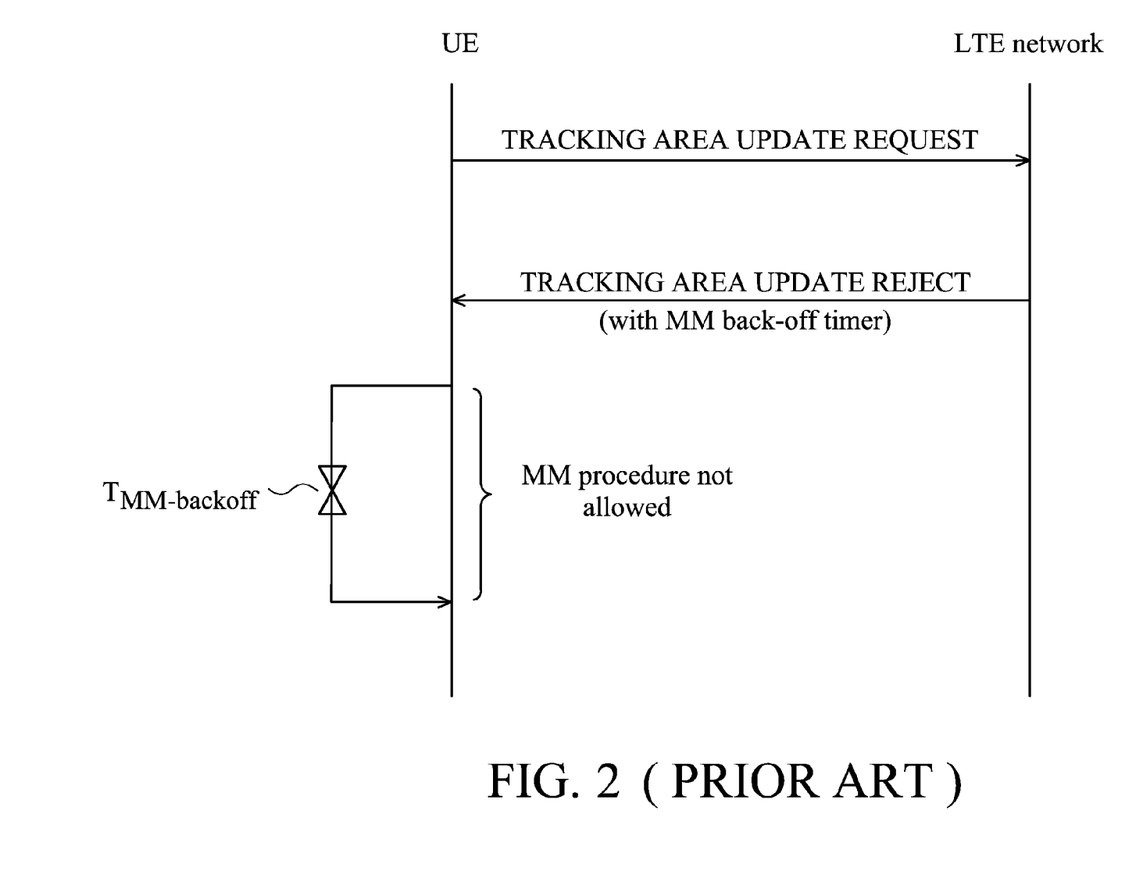
FIG. 2 is a block diagram illustrating an unsuccessful TAU procedure with an MM back-off timer.

Take the Evolved Packet System (EPS) in compliance with the 3GPP TS 23.401 specification, v.10.2.0 (referred to herein as the TS 23.401 specification), the 3GPP TS 24.301 specification, v.10.1.0 (referred to herein as the TS 24.301 specification) for example. During an Attach procedure, as shown in FIG. 1, or a Tracking Area Update (TAU) procedure, as shown in FIG. 2, the attachment request or the TAU request may be rejected due to the Non-Access Stratum (NAS) level congestion control of a first Public Land Mobile Network (PLMN). In this case, the ATTACH REJECT message or the TRACKING AREA UPDATE REJECT message comprises an MM back-off timer to limit the attachment retry or TAU retry of the UE towards the first PLMN. Specifically, the UE can not initiate any MM procedure, including the Attach procedure, the TAU procedure, and the Service Request procedure, with the first PLMN until the MM back-off timer expires. After being rejected by the first PLMN and the MM back-off timer is started for the first PLMN, the UE may reselect to a second PLMN to initiate the Attach procedure or the TAU procedure. If, unfortunately, the second PLMN is also congested and rejects the attachment request or the TAU request from the UE, the UE may receive another MM back-off timer in the rejection message from the second PLMN. Correspondingly, the UE stops the MM back-off timer associated with the first PLMN and starts the MM back-off timer associated with the second PLMN, since only one MM back-off timer (i.e., the MM back-off timer associated with the currently selected PLMN) should be maintained by the UE. This may result in a situation where the UE reselects back to the first PLMN which may be very likely still congested since the time period for the initial MM back-off timer associated with the first PLMN has not passed yet. Thus, the NAS level congestion control of the first PLMN would be impaired, and the obtainment of wireless services by the UE would be prolonged.

BRIEF SUMMARY OF THE INVENTION

In one aspect of the invention, a mobile communication device comprising a wireless module and a controller module is provided. The wireless module performs wireless transceiving to and from a service network and a second service network. The controller module transmits a first request message for an MM procedure to the first service network via the wireless module, and receives a first rejection message with an MM back-off timer corresponding to the first request message from the first service network via the wireless module. Also, the controller module starts the MM back-off timer for the first service network in response to the first rejection message, and transmits a second request message for the MM procedure to a second service network via the wireless module.

In another aspect of the invention, a method for handling MM back-off timers by a mobile communication device is provided. The method comprises the steps of transmitting a first request message for an MM procedure to a first service network, receiving a first rejection message with an MM back-off timer corresponding to the first request message from the first service network, starting the MM back-off timer for the first service network in response to the first rejection message, and transmitting a second request message for the MM procedure to a second service network.

Other aspects and features of the present invention will become apparent to those with ordinarily skill in the art upon review of the following descriptions of specific embodiments of apparatuses and methods for handling MM back-off timers.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 3:
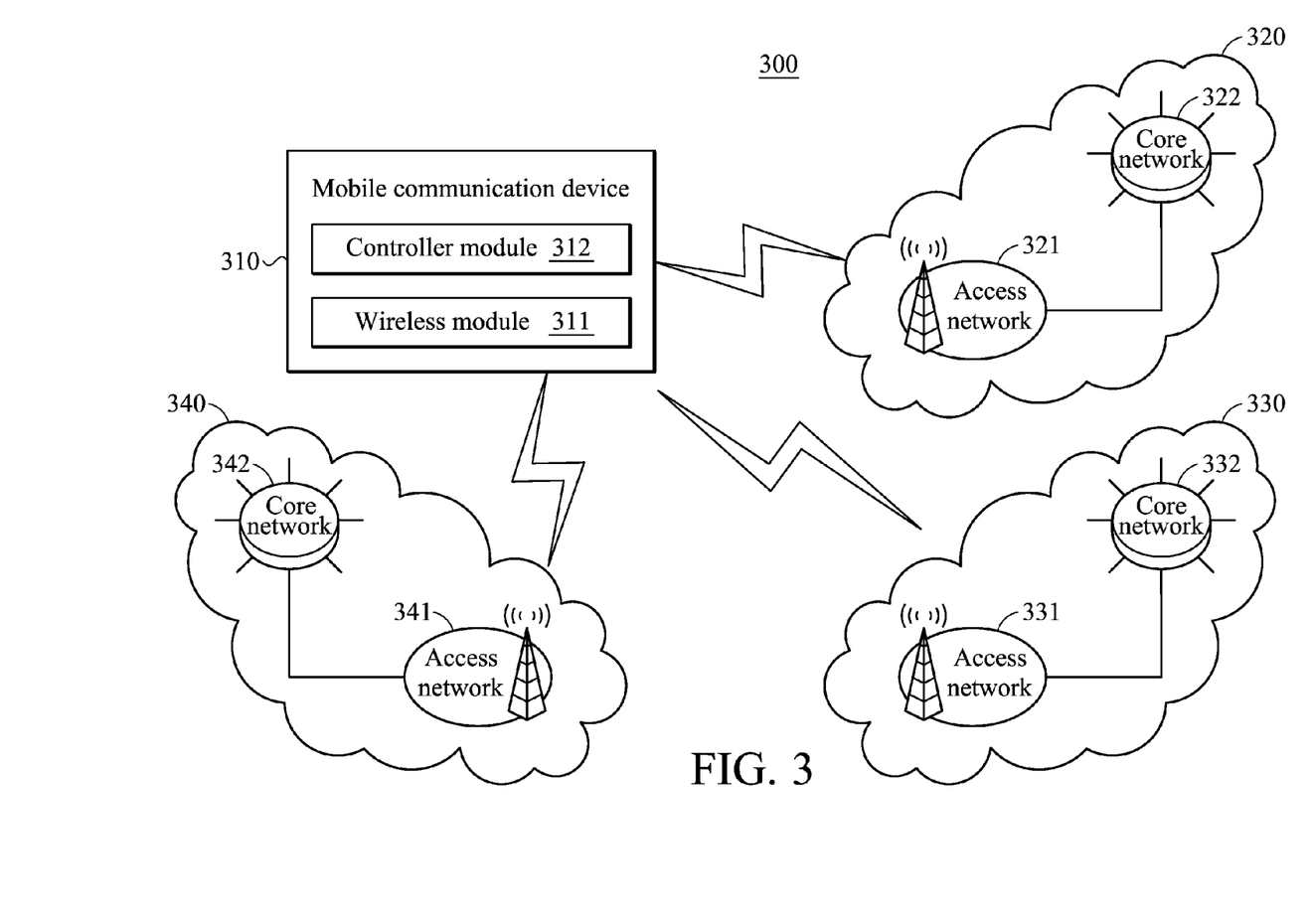
FIG. 3 is a block diagram illustrating a mobile communication environment according to an embodiment of the invention.

The following description is of the best-contemplated mode of carrying out the invention. This description is made for the purpose of illustrating the general principles of the invention and should not be taken in a limiting sense. The 3GPP specifications are used to teach the spirit of the invention, and the invention is not limited thereto. FIG. 3 is a block diagram illustrating a mobile communication environment according to an embodiment of the invention. In the mobile communication environment 300, the mobile communication device 310 is wirelessly connected to the service network 320, 330, or 340 for obtaining wireless services. The service networks 320 may comprise an access network (or called radio access network) 321 and a core network 322, the service network 330 may comprise an access network 331 and a core network 332, and the service network 340 may comprise an access network 341 and a core network 342. Each of the service networks 320, 330, and 340 may be the network in the Global System for Mobile Communication (GSM), Universal Mobile Telecommunications System (UMTS), or Evolved Packet System (EPS). Each of the access networks 321, 331, and 341 may be a GSM Edge Radio Access Network (GERAN) in the GSM technology, a UMTS Terrestrial Radio Access Network (UTRAN) in the WCDMA/HSPA technology, or an Evolved-UTRAN (E-UTRAN) in the LTE/LTE-Advanced technology. Each of the core networks 322, 332, 342 may be a GSM core or General Packet Radio Service (GPRS) core in the GSM/UMTS network, or an Evolved Packet Core (EPC) in the EPS. The mobile communication device 310 comprises a wireless module 311 for performing the functionality of wireless transmissions and receptions to and from the service network 320, 330, or 340, and a controller module 312 for controlling the operation of the wireless module 311 and other functional components, such as a display unit and/or keypad serving as the MMI (man-machine interface), a storage unit storing the program codes of applications or communication protocols, or others. Although not shown, a subscriber identity card may be provided to be coupled to the controller module 312, which stores the International Mobile Subscriber Identity (IMSI), the security keys used for identification and authentication with the service networks, and other operation related data acquired during communications with the service networks, such as the Equivalent PLMN list and Forbidden PLMN list, etc. The subscriber identity card may be a Subscriber Identity Module (SIM) card or a Universal SIM (USIM) card.

In the following embodiments, the system may be GSM/UMTS/EPS, where the service networks 320, 330, and 340 may be GSM/UMTS/EPS networks each belongs to a respective PLMN, and the mobile communication device 310 may be a Mobile Station (MS) or User Equipment (UE). The UMTS/EPS is in compliance with the 3GPP TS 23.060/TS 23.401, 3GPP TS 24.008/TS 24.301, 3GPP TS 23.122 specifications and/or other related specifications of the UMTS/EPS. Based on the technology used, the messages of Mobility Management (MM) operations may correspond to GSM/UMTS/EPS, respectively, e.g. MM message for Location Area Update, GMM message for Routing Area Update, and EPS Mobility Management (EMM) message for Tracking Area Update. Further, the TAU/RAU procedure may be a combined TA/LA or combined RA/LA procedure in which the TAU/RAU REQUEST message indicates that the mobile communication device 310 wishes to perform TA/RA and LA update for a Packet-Switched domain and a Circuit-Switched (CS) domain, respectively. The Attach procedure may be an ATTACH REQUEST message for a Circuit-Switched domain service in GSM/UMTS system or for a Packet-Switched domain service in GSM/UMTS/EPS system; further, the Attach procedure may be a combined Attach procedure in which the ATTACH REQUEST message indicates that the mobile communication device 310 wishes to start a packet data session and a Circuit-Switched (CS) domain service with the service network 320 for mobile communication services. The messages of MM operations may also comprise a SERVICE REQUEST or EXTENDED SERVICE REQUEST message for requesting a Circuit-Switched (CS) or Packet-Switched (PS) service in GSM/UMTS/EPS system.

Figure 4:
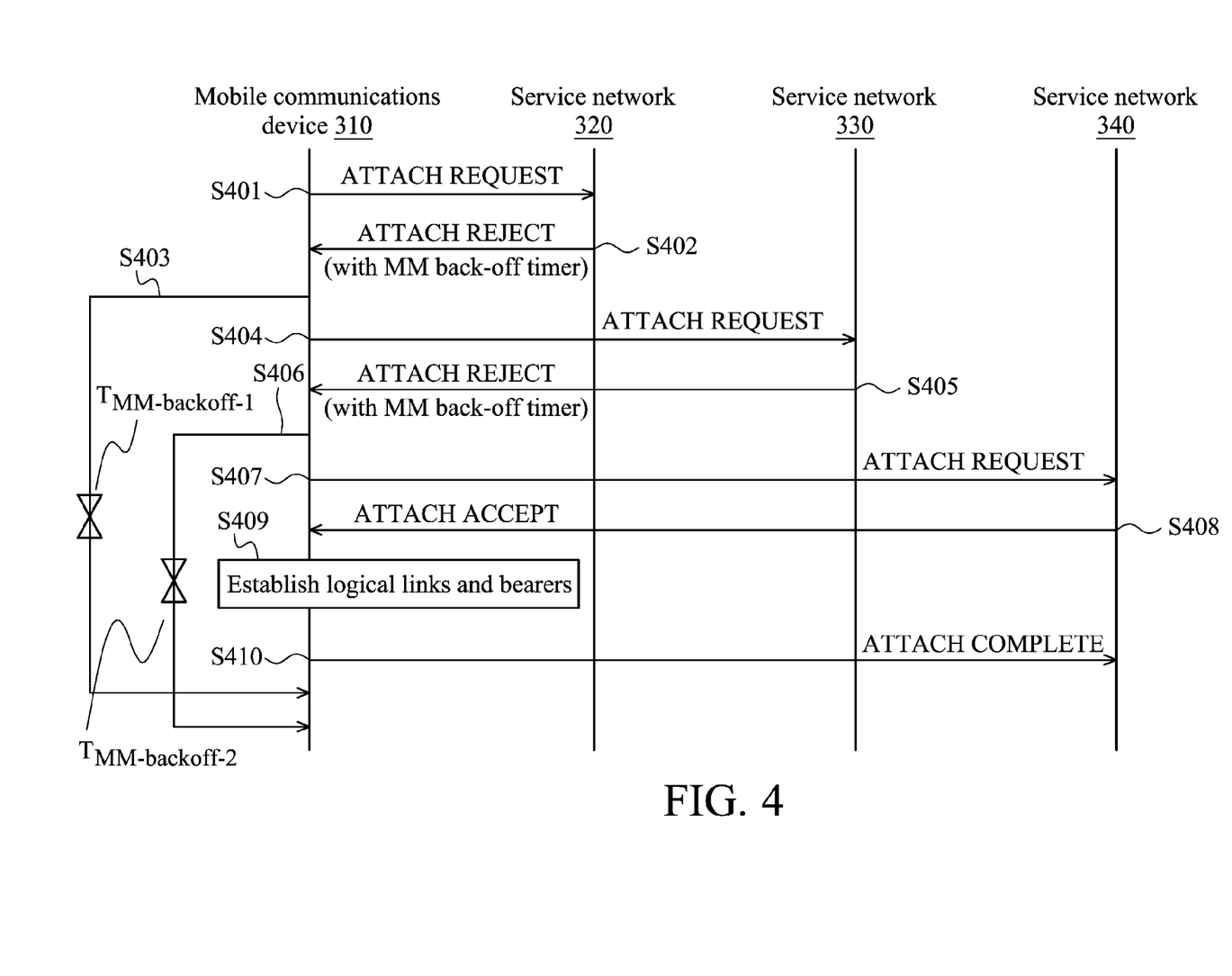
FIG. 4 is a message sequence chart illustrating the handling of MM back-off timers during Attach procedures with multiple service networks according to an embodiment of the invention.

To be more specific, the controller module 312 controls the wireless module 311 for performing Attach procedures and TAU procedures with the service networks 320, 330, and 340. FIG. 4 is a message sequence chart illustrating the handling of Mobility Management (MM) back-off timers during Attach procedures with multiple service networks according to an embodiment of the invention. To start, the controller module 312 transmits an ATTACH REQUEST message to the service network 320 via the wireless module 311 (step S401). The ATTACH REQUEST message may comprise the registration information concerning the mobile communication device 310. Specifically, the ATTACH REQUEST message indicates that the mobile communication device 310 requests to register with the service network 320 for mobile communication services. When receiving the ATTACH REQUEST message, the core network 322 decides to reject the attachment request due to the fact that the NAS level congestion control is applied on core network 322 which is congested, and then replies to the mobile communication device 310 with an ATTACH REJECT message comprising an EMM cause value and an MM back-off timer (step S402). In response to receiving the ATTACH REJECT message via the wireless module 311, the controller module 312 starts the MM back-off timer associated with the service network 320 (step S403), and does not initiate any MM procedure with the service network 320 until the MM back-off timer expires. Subsequently, the controller module 312 performs a PLMN selection procedure to search for a service network belonging to another PLMN via the wireless module 311, since the core network 322 is congested and the wireless services may not be obtained therefrom for a certain period of time. Please note that the controller module 312 may wait for a random period of time to trigger the PLMN selection before the expiry of the MM back-off timer, which is to avoid the rejected back-off UEs flocking into the same service network and resulting in the congestion of the service network. Specifically, the controller module 312 transmits an ATTACH REQUEST message to the service network 330 via the wireless module 311 (step S404), due to the fact that the detected signal from the service network 330 is better than the detected signal from the service network 340, or the PLMN to which the service network 330 belongs has a higher priority than the PLMN to which the service network 340 belongs. If the core network 332 is also congested when receiving the ATTACH REQUEST message, it replies to the mobile communication device 310 with an ATTACH REJECT message comprising an EMM cause value and an MM back-off timer (step S405). In response to receiving the ATTACH REJECT message via the wireless module 311, the controller module 312 starts the MM back-off timer associated with the service network 330 (step S406), and does not initiate any MM procedure with the service network 330 until the MM back-off timer expires. Next, the controller module 312 performs another PLMN selection procedure to search for a service network belonging to another PLMN via the wireless module 311, since there are MM back-off timers associated with the respective service networks 320 and 330 running in the controller module 312, i.e., the core networks 322 and 332 are congested and the wireless services may not be obtained therefrom for a certain period of time. Specifically, the controller module 312 transmits an ATTACH REQUEST message to the service network 340 via the wireless module 311 (step S407). In this embodiment, it is assumed that the core network 342 is not congested when receiving the ATTACH REQUEST message from the mobile communication device 310, so it replies to the mobile communication device 310 with an ATTACH ACCEPT message comprising configuration information for activating the logical links and bearers for the packet data services, such as the Packet Data Network (PDN) Connection and the multimedia broadcast/multicast services (MBMS) contexts (step S408). In response to the ATTACH ACCEPT message, the mobile communication device 310 establishes the logical links and the bearers for the packet data services according to the configuration information (step S409), and transmits an ATTACH COMPLETE message to the service network 340 (step S410), to acknowledge that it has received the ATTACH ACCEPT message. The Attach procedure ends when the service network 340 receives the ATTACH COMPLETE message, and the packet data services may be provided to the mobile communication device 310. Note that, the mobile communication device 310 maintains a respective MM back-off timer for each service network which has rejected the attach request from the mobile communication device 310, so as to avoid the mobile communication device 310 from reselecting back to a congested service network before the corresponding MM back-off timer expires, and to guarantee the functioning of the NAS level congestion control of the congested service networks.

Figure 5:
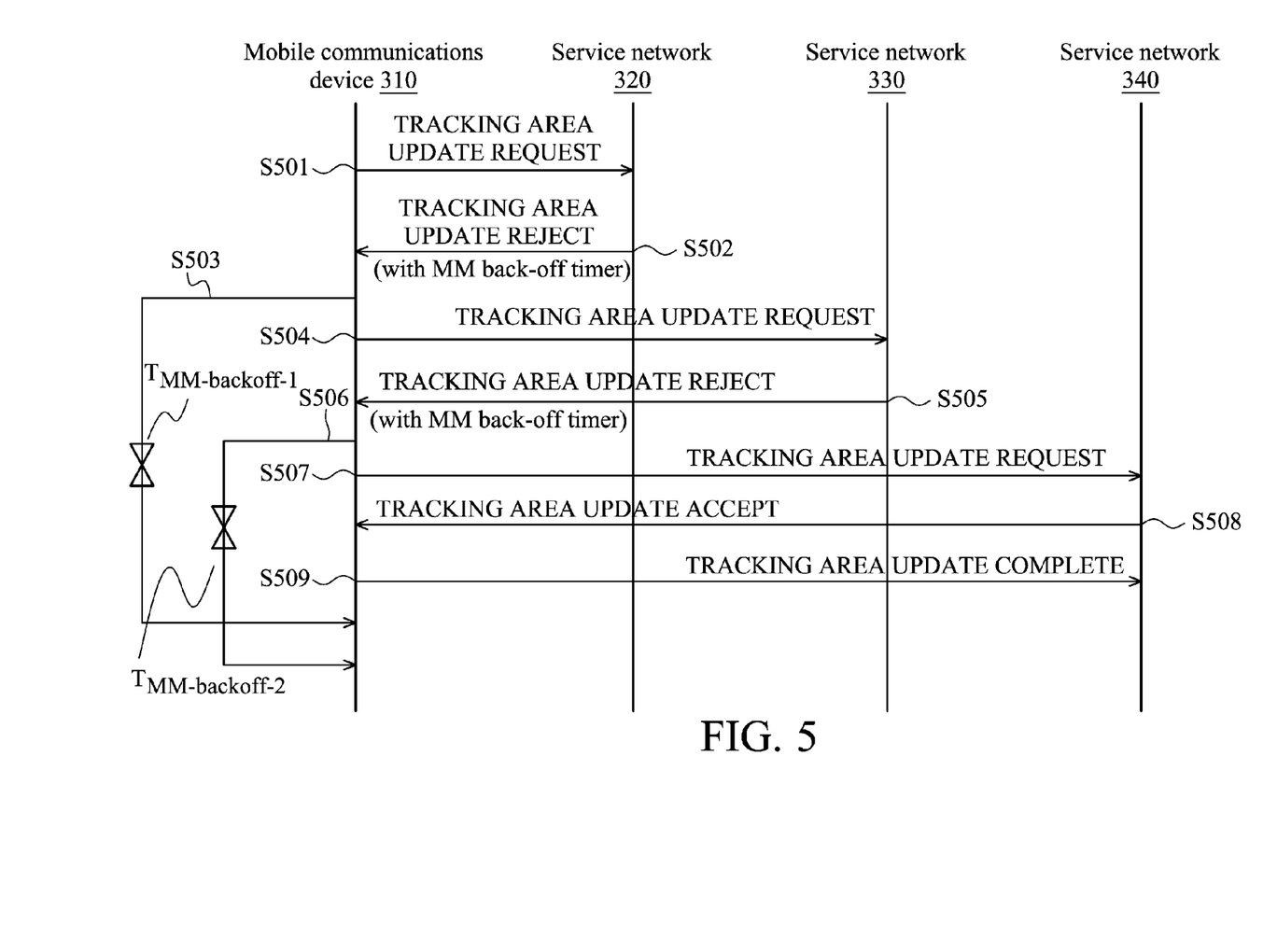
FIG. 5 is a message sequence chart illustrating the handling of MM back-off timers during TAU procedures with multiple service networks according to an embodiment of the invention.

FIG. 5 is a message sequence chart illustrating the handling of MM back-off timers during TAU procedures with multiple service networks according to an embodiment of the invention. To start, the controller module 312 transmits a TRACKING AREA UPDATE REQUEST message to the service network 320 via the wireless module 311 (step S501). The TRACKING AREA UPDATE REQUEST message may comprise the information concerning the TA which the mobile communication device 310 is currently in. When receiving the TRACKING AREA UPDATE REQUEST message, the core network 322 decides to reject the TAU request due to the fact that the NAS level congestion control is applied on core network 322 which is congested, and then replies to the mobile communication device 310 with a TRACKING AREA UPDATE REJECT message comprising an EMM cause value and an MM back-off timer (step S502). In response to receiving the TRACKING AREA UPDATE REJECT message via the wireless module 311, the controller module 312 starts the MM back-off timer associated with the service network 320 (step S503), and does not initiate any MM procedure with the service network 320 until the MM back-off timer expires. Subsequently, the controller module 312 performs a PLMN selection procedure to search for a service network belonging to another PLMN via the wireless module 311, since the core network 322 is congested and the wireless services may not be obtained therefrom for a certain period of time. Please note that the controller module 312 may wait for a random period of time to trigger the PLMN selection before the expiry of the MM back-off timer, which is to avoid the rejected back-off UEs flocking into the same service network and resulting in the congestion of the service network. Specifically, the controller module 312 transmits a TRACKING AREA UPDATE REQUEST message to the service network 330 via the wireless module 311 (step S504), due to the fact that the detected signal from the service network 330 is better than the detected signal from the service network 340, or the PLMN to which the service network 330 belongs has a higher priority than the PLMN to which the service network 340 belongs. If the core network 332 is also congested when receiving the TRACKING AREA UPDATE REQUEST message, it replies to the mobile communication device 310 with a TRACKING AREA UPDATE REJECT message comprising an EMM cause value and an MM back-off timer (step S505). In response to receiving the TRACKING AREA UPDATE REJECT message via the wireless module 311, the controller module 312 starts the MM back-off timer associated with the service network 330 (step S506), and does not initiate any MM procedure with the service network 330 until the MM back-off timer expires. Next, the controller module 312 performs another PLMN selection procedure to search for a service network belonging to another PLMN via the wireless module 311, since there are MM back-off timers associated with the service networks 320 and 330 running in the controller module 312, i.e., the core networks 322 and 332 are congested and the wireless services may not be obtained therefrom for a certain period of time. Specifically, the controller module 312 transmits a TRACKING AREA UPDATE REQUEST message to the service network 340 via the wireless module 311 (step S507). In this embodiment, it is assumed that the core network 342 is not congested when receiving the TRACKING AREA UPDATE REQUEST message from the mobile communication device 310, so the service network 340 replies to the mobile communication device 310 with a TRACKING AREA UPDATE ACCEPT message which comprises a new Globally Unique Temporary Identity (GUTI) or new Tracking Area identity (TAI) list if either has changed (step S508). In response to the TRACKING AREA UPDATE ACCEPT message, the mobile communication device 310 transmits a TRACKING AREA UPDATE COMPLETE message to the service network 340 (step S509), to acknowledge that it has received the TRACKING AREA UPDATE ACCEPT message. The TAU procedure ends when the service network 340 receives the TRACKING AREA UPDATE COMPLETE message. Note that, the mobile communication device 310 maintains a respective MM back-off timer for each service network which has rejected the TAU request from the mobile communication device 310, so as to avoid the mobile communication device 310 from reselecting back to a congested service network before the corresponding MM back-off timer expires, and to guarantee the functioning of the NAS level congestion control of the congested service networks.

Note that, in one embodiment, the mobile communication device 310 may be powered off or the mobile communication function of the mobile communication device 310 may be switched off (such as the Flight mode) before the step S407 or S507, and the controller module 312 may store the statuses of the MM back-off timers associated with the service networks 320 and 330 in the subscriber identity card coupled to the controller module 312 since the MM back-off timers associated with the service networks 320 and 330 has not yet expired. Alternatively, the controller module 312 may periodically store the statuses of the MM back-off timers associated with the service networks 320 and 330 in the subscriber identity card, before the mobile communication device 310 is powered off or the mobile communication function of the mobile communication device 310 is switched off. Later, when the mobile communication device 310 is powered on or the mobile communication function of the mobile communication device 310 is switched off again, the controller module 312 may restart the MM back-off timers associated with the service networks 320 and 330 with the value of the remaining time for the MM back-off timers to avoid from initiating any MM procedure with the service networks 320 and 330. Particularly, if the subscriber identity card is decoupled from the controller module 312 and then coupled back, the controller module 312 does not remove the stored statuses of the MM back-off timers from the subscriber identity card. In another embodiment, the controller module 312 may store the statuses of the MM back-off timers associated with the service networks 320 and 330 in a storage unit, such as a Micro Secure Digital Memory Card (Micro-SD card), of the mobile communication device 310 instead, in response to the mobile communication device 310 being powered off or the mobile communication function of the mobile communication device 310 being switched off Alternatively, the controller module 312 may periodically store the statuses of the MM back-off timers associated with the service networks 320 and 330 in the storage unit, before the mobile communication device 310 is powered off or the mobile communication function of the mobile communication device 310 is switched off.

Figure 6:
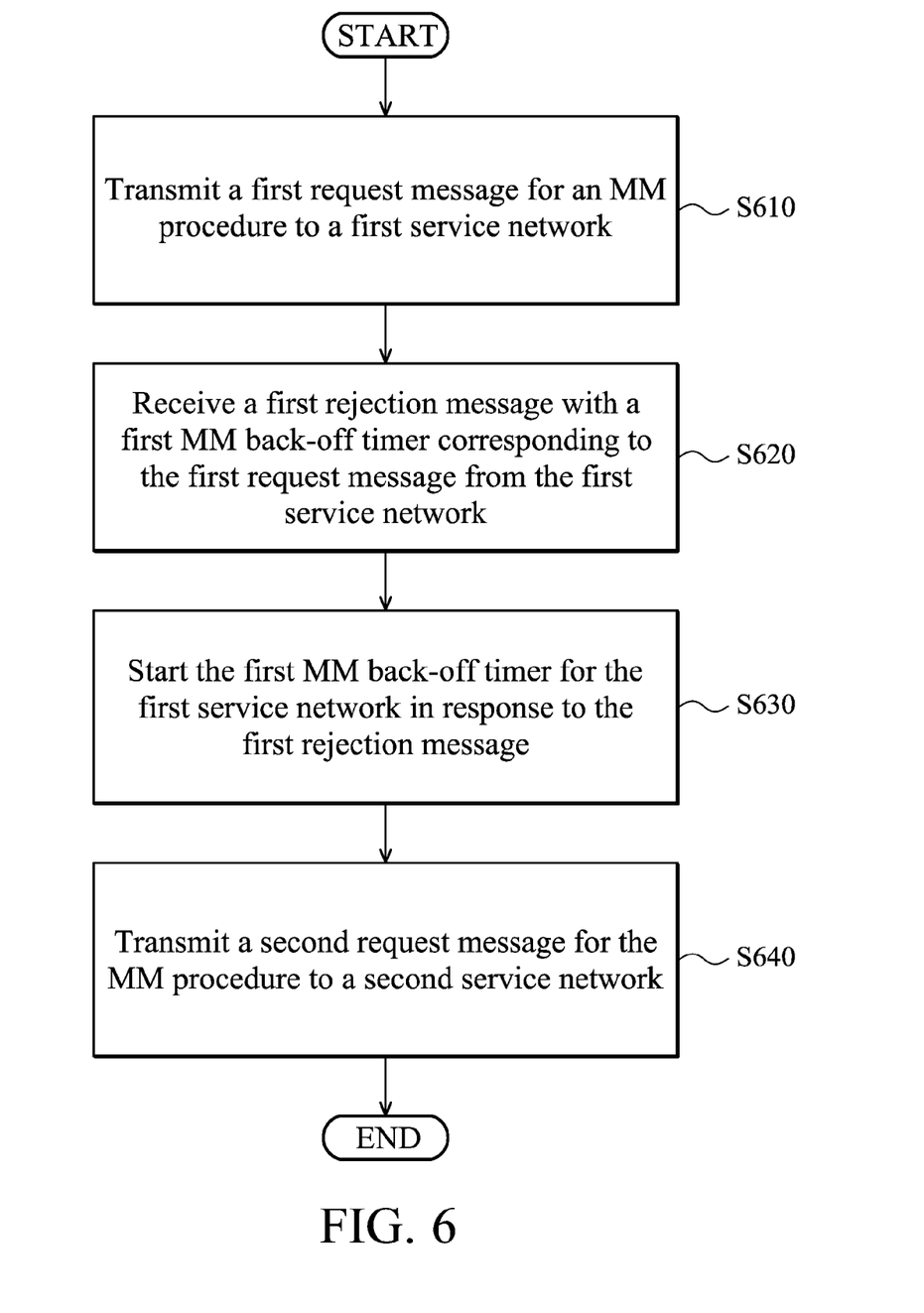
FIG. 6 is a flow chart illustrating a method for handling MM back-off timers by a mobile communication device according to an embodiment of the invention.

FIG. 6 is a flow chart illustrating a method for handling MM back-off timers by a mobile communication device according to an embodiment of the invention. To begin, the mobile communication device transmits a request message for an MM procedure to a first service network (step S610), and then receives a first rejection message with a first MM back-off timer corresponding to the first request message from the first service network (step S620). After that, the mobile communication device starts the first MM back-off timer for the first service network in response to the first rejection message (step S630). Subsequently, the mobile communication device transmits a second request message for the MM procedure to the second service network (step S640). Specifically, the mobile communication device may transmit a first request message for the MM procedure to the first service network, and subsequently transmit a second request message for the MM procedure to the second service network if receiving the rejection message with the first MM back-off timer from the first service network. Similarly, the mobile communication device may receive a first rejection message with a first MM back-off timer from the first service network, and subsequently receive a second rejection message with a second MM back-off timer from the second service network. In one embodiment, the MM procedure is an Attach procedure, and the request message and the rejection message are an ATTACH REQUEST message and an ATTACH REJECT message, respectively. In another embodiment, the MM procedure is a Tracking Area Update procedure, and the request message and the rejection message are a TRACKING ARE UPDATE REQUEST message and a TRACKING ARE UPDATE REJECT message, respectively. During the running period of the MM back-off timers, the mobile communication device can not initiate any MM procedure with the first service network and the second service network. The mobile communication device may initiate a PLMN selection procedure to search for service networks other than the first service network and the second service network after waiting for a random period of time, which is to avoid the problem of a massive number of rejected UEs flocking into a same service network.

In one embodiment, the mobile communication device may store the statuses of the running MM back-off timers in a subscriber identity card coupled thereto or therein periodically, or store the statuses of the running MM back-off timers in the subscriber identity card in response to the mobile communication device being powered off In another embodiment, the mobile communication device may store the statuses of the running MM back-off timers in a storage unit or device memory (such as a Micro-SD card) periodically, or store the statuses of the running MM back-off timers in the storage unit or device memory in response to the mobile communication device being powered off Since the MM back-off timers are properly maintained in a per-PLMN basis, the mobile communication device may avoid reselecting back to the service networks with MM back-off timers running Thus, the NAS level congestion controls of the service networks may function normally, and the mobile communication device may speed up the process of finding an available PLMN for obtaining wireless services.

While the invention has been described by way of example and in terms of preferred embodiment, it is to be understood that the invention is not limited thereto. Those who are skilled in this technology can still make various alterations and modifications without departing from the scope and spirit of this invention. For example, the method for handling MM back-off timers may also be applied to mobile communication devices in compliance with any evolutionary technology of the WCDMA/LTE/LTE-Advanced technology. Therefore, the scope of the present invention shall be defined and protected by the following claims and their equivalents.

What is claimed is:

1. A mobile communication device, comprising:
a wireless module performing wireless transceiving to and from a first service network and a second service network; and
a controller module transmitting a first request message for a Mobility Management (MM) procedure to the first service network via the wireless module, receiving a first rejection message with a first MM back-off timer corresponding to the first request message from the first service network via the wireless module, starting the first MM back-off timer for the first service network in response to the first rejection message, transmitting a second request message for the MM procedure to the second service network via the wireless module, receiving a second rejection message with a second MM back-off timer from the second service network via the wireless module, and in response to the second rejection message, keeping the first MM back-off timer running for the first service network when it is not yet expired and starting the second MM back-off timer for the second service network,
wherein the controller module is coupled to a subscriber identity card, and further stores statuses of the first and second MM back-off timers in the subscriber identity card periodically before the mobile communication device is powered off, or stores the statuses of the first and second MM back-off timers in the subscriber identity card in response to the mobile communication device being powered off.

2. The mobile communication device of claim 1, wherein the second request message is transmitted in response to initiating a Public Land Mobile Network (PLMN) selection procedure to search for another second service network other than the first service network.

3. The mobile communication device of claim 1, wherein the controller module does not remove the statuses of the first and second MM back-off timers from the subscriber identity card, in response to the subscriber identity card being decoupled from the controller module and then coupled back thereto.

4. The mobile communication device of claim 1, further comprising a storage unit, wherein the controller module further stores statuses of the first and second MM back-off timers in the storage unit.

5. The mobile communication device of claim 1, wherein the MM procedure is an Attach procedure, and the first request message and the first rejection message are an ATTACH REQUEST message and an ATTACH REJECT message, respectively.

6. The mobile communication device of claim 1, wherein the MM procedure is a Tracking Area Update procedure, and the first request message and the first rejection message are a TRACKING AREA UPDATE REQUEST message and a TRACKING AREA UPDATE REJECT message, respectively.

7. A method for handling Mobility Management (MM) back-off timers by a mobile communication device coupled to a subscriber identity card, comprising:
   transmitting a first request message for an MM procedure to a first service network;
   receiving a first rejection message with a first MM back-off timer corresponding to the first request message from the first service network;
   starting the first MM back-off timer for the first service network in response to the first rejection messages;
   transmitting a second request message for the MM procedure to a second service network;
   receiving a second rejection message with a second MM back-off timer from the second service network;
   in response to the second rejection message, keeping the first MM back-off timer running for the first service network when it is not yet expired and starting the second MM back-off timer for the second service network; and
   storing statuses of the first and second MM back-off timers in the subscriber identity card periodically before the mobile communication device is powered off, or storing the statuses of the first and second MM back-off timers in the subscriber identity card in response to the mobile communication device being powered off.

8. The method of claim 7, wherein the second request message is transmitted in response to initiating a Public Land Mobile Network (PLMN) selection procedure to search for another second service network other than the first service network.

9. The method of claim 7, further comprising:
   not removing the statuses of the first and second MM back-off timers from the subscriber identity card, in response to the subscriber identity card being decoupled from the mobile communication device and then coupled back thereto.

10. The method of claim 7, wherein the mobile communication device further comprises a storage unit, and the method further comprises storing statuses of the first and second MM back-off timers in the storage unit.

11. The method of claim 7, wherein the MM procedure is an Attach procedure, and the first request message and the first rejection message are an ATTACH REQUEST message and an ATTACH REJECT message, respectively.

12. The method of claim 7, wherein the MM procedure is a Tracking Area Update procedure, and the first request message and the first rejection message are a TRACKING AREA UPDATE REQUEST message and a TRACKING AREA UPDATE REJECT message, respectively.

* * * * *